(12) United States Patent
Zimmerman et al.

(10) Patent No.: US 10,052,958 B2
(45) Date of Patent: Aug. 21, 2018

(54) OVERHEAD POWER GRID FOR MOBILE MINING MACHINES

(71) Applicant: Joy MM Delaware, Inc., Wilmington, DE (US)

(72) Inventors: Joseph J. Zimmerman, Franklin, PA (US); Garrett L. Lowman, Polk, PA (US); Andrew W. Struthers, Jackson Center, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/488,195

(22) Filed: Apr. 14, 2017

(65) Prior Publication Data

US 2017/0282721 A1 Oct. 5, 2017

Related U.S. Application Data

(63) Continuation of application No. 15/070,899, filed on Mar. 15, 2016, now Pat. No. 9,623,755, which is a
(Continued)

(51) Int. Cl.
*B60L 5/00* (2006.01)
*B60L 5/08* (2006.01)
(Continued)

(52) U.S. Cl.
CPC ............. *B60L 5/085* (2013.01); *B60L 5/04* (2013.01); *B60L 5/36* (2013.01); *B60M 1/02* (2013.01);
(Continued)

(58) Field of Classification Search
CPC . B60M 1/14; B60M 1/12; B60M 1/01; B60M 3/068; B60L 5/36; B60L 5/12;
(Continued)

(56) References Cited

U.S. PATENT DOCUMENTS 1,366,142 A * 1/1921 Wilson ..................... B60L 5/12
191/50
2,478,147 A 8/1949 Wilson
(Continued)

FOREIGN PATENT DOCUMENTS

DE 10256705 A1 7/2004
FR 2462297 A1 2/1981
(Continued)

OTHER PUBLICATIONS

Examination Report from the Intellectual Property Office of Great Britain for British Application No. GB1301612.6 dated Jun. 23, 2014 (3 pages).
(Continued)

*Primary Examiner* — Jason C Smith
(74) *Attorney, Agent, or Firm* — Michael Best & Friedrich LLP

(57) ABSTRACT

A vehicle is provided that connects to an power structure for powering and guiding the vehicle. The power structure includes a trolley, a track along which the trolley runs, a power source connected to the track, and a cable connected to the trolley and configured to attach to the vehicle moving on a surface. The vehicle includes a chassis and a cable connected to the chassis and configured to mechanically and electrically connect the vehicle to the power structure. The chassis includes a connector rotatable 360 degrees, and the cable connects to the chassis through the connector.

20 Claims, 17 Drawing Sheets

Related U.S. Application Data continuation of application No. 14/738,378, filed on Jun. 12, 2015, now Pat. No. 9,283,866, which is a continuation-in-part of application No. 13/755,239, filed on Jan. 31, 2013, now Pat. No. 9,056,558.

(60) Provisional application No. 61/593,073, filed on Jan. 31, 2012.

(51) Int. Cl.

| | | |
|---|---|---|
| *B60M 1/12* | (2006.01) | |
| *B60M 1/14* | (2006.01) | |
| *B60M 1/02* | (2006.01) | |
| *B60M 1/32* | (2006.01) | |
| *B60L 5/04* | (2006.01) | |
| *B60L 5/36* | (2006.01) | |
| *B60M 1/18* | (2006.01) | |

(52) U.S. Cl.
CPC ............... *B60M 1/12* (2013.01); *B60M 1/14* (2013.01); *B60M 1/18* (2013.01); *B60M 1/32* (2013.01); *B60L 2200/26* (2013.01); *B60L 2200/40* (2013.01)

(58) Field of Classification Search
CPC ...... B60L 5/19; B60L 5/14; B60L 7/10; B60L 7/00; B60L 9/18
USPC ........ 191/33 R, 45 R, 38, 50, 51, 52, 41, 55
See application file for complete search history.

(56) References Cited

U.S. PATENT DOCUMENTS

| | | | | |
|---|---|---|---|---|
| 2,625,344 | A * | 1/1953 | Flansburgh | H02G 11/02 191/12.2 A |
| 3,632,906 | A * | 1/1972 | Aihara | H02G 11/02 191/12.2 A |
| 4,338,498 | A * | 7/1982 | Murphy | B60L 5/12 191/66 |
| 4,700,023 | A * | 10/1987 | Hillmann | B06M 7/00 191/12 R |
| 4,791,871 | A * | 12/1988 | Mowll | B60L 5/40 104/88.02 |
| 4,878,607 | A * | 11/1989 | Lessard | B66D 3/003 226/24 |
| 5,297,661 | A * | 3/1994 | Tschurbanoff | B60M 1/32 104/99 |
| 5,551,545 | A | 9/1996 | Gelfman | |
| 6,193,035 | B1 * | 2/2001 | Conrad | B60L 5/12 191/64 |
| 6,272,406 | B2 | 8/2001 | Alofs et al. | |
| 8,583,303 | B2 * | 11/2013 | Bastien | E21F 13/00 701/22 |
| 9,315,107 | B2 * | 4/2016 | Tojima | B60L 5/24 |
| 2008/0282583 | A1 * | 11/2008 | Koellner | E02F 3/304 37/348 |
| 2011/0094841 | A1 * | 4/2011 | Mazumdar | B60L 7/10 191/33 R |
| 2012/0175209 | A1 | 7/2012 | Mazumdar et al. | |
| 2013/0192944 | A1 * | 8/2013 | Zimmerman | B60L 5/36 191/38 |
| 2013/0248311 | A1 * | 9/2013 | Czainski | B60L 5/005 191/10 |
| 2014/0032028 | A1 * | 1/2014 | Saito | B60L 5/045 701/22 |
| 2015/0283921 | A1 * | 10/2015 | Zimmerman | B60M 1/12 191/38 |
| 2016/0090007 | A1 * | 3/2016 | Buehs | B60L 5/045 191/33 R |

FOREIGN PATENT DOCUMENTS

| | | | |
|---|---|---|---|
| FR | 2534199 | A1 | 4/1984 |
| FR | 2590419 | A1 | 5/1987 |
| GB | 1342352 | A | 1/1974 |
| GB | 2075449 | A | 11/1981 |
| PL | 92795 | B3 | 4/1977 |
| PL | 331697 | A1 | 9/1999 |
| PL | 369477 | A1 | 2/2006 |
| PL | 384144 | A1 | 7/2009 |
| RU | 2096198 | C1 | 11/1997 |
| SU | 592634 | A1 | 2/1978 |
| SU | 1164094 | A2 | 6/1985 |
| SU | 11684-44 | A1 | 7/1985 |
| WO | 9117905 | A1 | 11/1991 |

OTHER PUBLICATIONS

Examination Report from the Intellectual Property Office of Australia for Australian Application No. 2013200541 dated Jul. 11, 2014 (3 pages).
GB1301612.6 United Kingdom Search Report dated May 28, 2013 (5 pages).
P402607 Search Report from the Patent Office of the Republic of Poland dated Jun. 12, 2013 (2 pages).
Australian Patent Examination Report No. 1 for Application No. 2013200541 dated Jun. 24, 2013 (6 pages).
Combined Search and Examination Report from the Intellectual Property Office of Great Britain for Application No. GB1501287.5 dated Jun. 15, 2015 (7 pages).
Examination Report from the Intellectual Property Office of Great Britain for Application No. GB1301612.6 dated Feb. 27, 2015 (2 pages).
Examination Report from the Intellectual Property Office of Great Britain for Application No. GB1301612.6 dated Sep. 24, 2014 (4 pages).
Examination Report from the Intellectual Property Office of Great Britain for Application No. GB1301612.6 dated Jun. 15, 2015 (2 pages).
Examination Report from the United Kingdom Intellectual Property Office for Application No. GB1501287.5 dated Mar. 17, 2016 (4 pages).
Examination Report from the United Kingdom Intellectual Property Office for Application No. GB1501287.5 dated Nov. 6, 2015 (4 pages).
Examination Report No. 1 from the Australian Patent Office for Application No. 2014280912 dated Dec. 18, 2015 (5 pages).
Search Report from the United Kingdom Intellectual Property Office for Application No. GB1603788.9 dated Mar. 17, 2016 (5 pages).
2nd Office Action from the Chilean Patent Office for Application No. 0299-2013 dated Sep. 27, 2016 (10 pages).
2nd Office Action with English translation from the State Intellectual Property Office of the People's Republic of China for Application No. 201310092113.4 dated Jun. 21, 2016 (15 pages).
Search Report from the United Kingdom Intellectual Property Office for Application No. GB1602478.8 dated Jul. 27, 2016 (4 pages).

\* cited by examiner

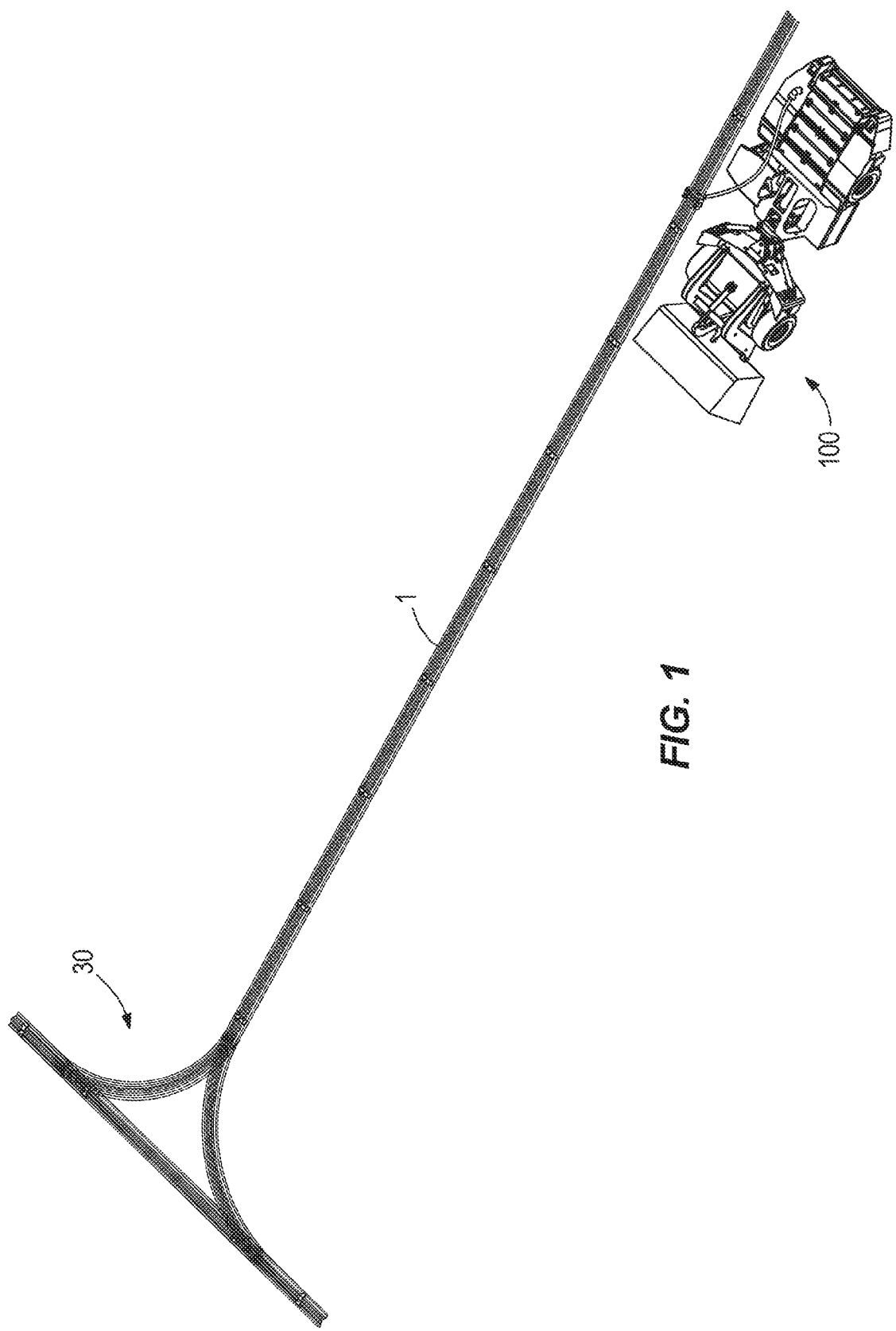

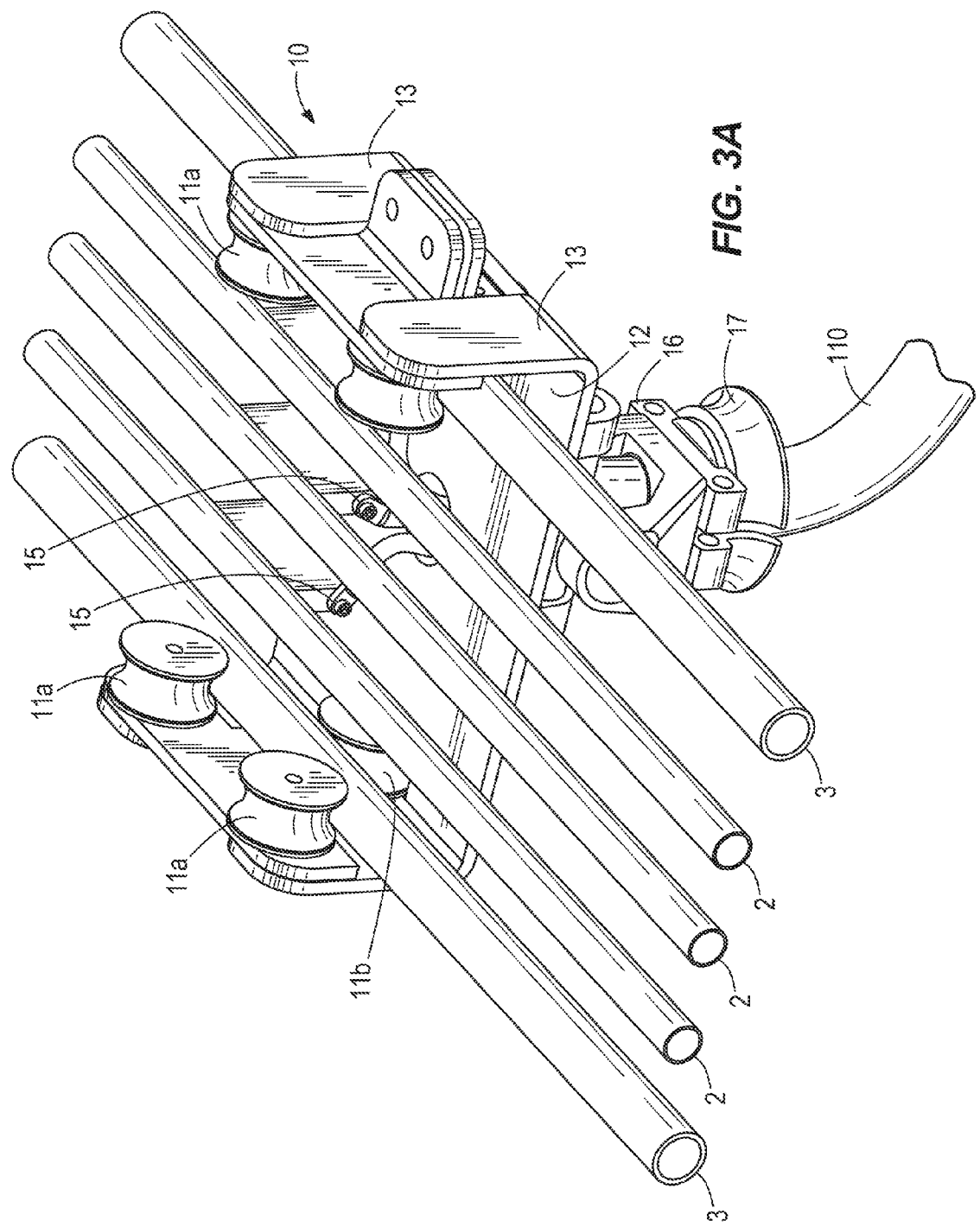

OVERHEAD POWER GRID FOR MOBILE MINING MACHINES

CROSS-REFERENCE TO RELATED APPLICATIONS

The present application is a continuation of co-pending, prior-filed U.S. patent application Ser. No. 15/070,899, which is a continuation of U.S. patent application Ser. No. 14/738,378, filed Jun. 12, 2015, which is a continuation-in-part of U.S. patent application Ser. No. 13/755,239, filed Jan. 31, 2013, which claims priority to U.S. Provisional Patent Application No. 61/593,073, filed Jan. 31, 2012. The entire contents and disclosure of these documents are incorporated by reference herein.

BACKGROUND

The present invention relates to movable electric machinery, and, more particularly, to a power grid connected to movable electric machinery.

Heavy mining machinery used in surface mining and underground "hard rock" mining is typically powered by diesel engines. There has long been a need to reduce the health risks associated with operating such diesel engines in confined surface and underground mining applications. Specifically, diesel engines emit particulate matter harmful to humans, create high noise levels, and add significantly to the "heat loading" in an underground mine. Additionally, the high cost of diesel fuel and diesel engine maintenance present additional downsides.

Conventional overhead grid powered systems, such as rail transportation systems, use pantographs that slide on an overhead wire. These systems require the use of rail based guidance to keep the movable machine (locomotive) within an acceptable proximity to the overhead wires (conductors). Pantograph systems have been attempted to be implemented with haul trucks, but such pantograph systems do not include any "switching" means to switch the direction of travel along the roadway or rail other than lowering the pantograph, going back on diesel power to make the turn, and then re-engaging the pantograph to get back on overhead power.

SUMMARY

According to an embodiment of the invention, a power structure is provided for powering and guiding a vehicle. The power structure includes a trolley, a plurality of generally tubular and parallel segments forming a track along which the trolley runs, a power source connected to the tubular segments, and a cable connected to the trolley and configured to attach to a vehicle moving on a surface. The cable mechanically and electrically connects the vehicle to the trolley.

According to another embodiment of the invention, a vehicle is configured to connect to a power structure. The vehicle includes a chassis and a cable connected to the chassis and configured to mechanically and electrically connect the vehicle to the power structure.

BRIEF DESCRIPTION OF THE DRAWINGS

FIG. 1 is a top perspective view of a mobile mining machine connected to a power grid according to an embodiment of the invention.

FIG. 3A is a perspective view of a trolley for the power grid according to another embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

FIGS. 1 and 2 illustrate a mobile mining machine 100 (such as a load-haul-dump vehicle, hereinafter "LHD") mining operations. The LHD 100 is electrically and mechanically connected to a power structure 1 (e.g., an overhead power structure) via a trolley 10. The overhead power structure 1 may be a free standing structure or may be suspended from a ceiling of a mine.

Figure 2A:
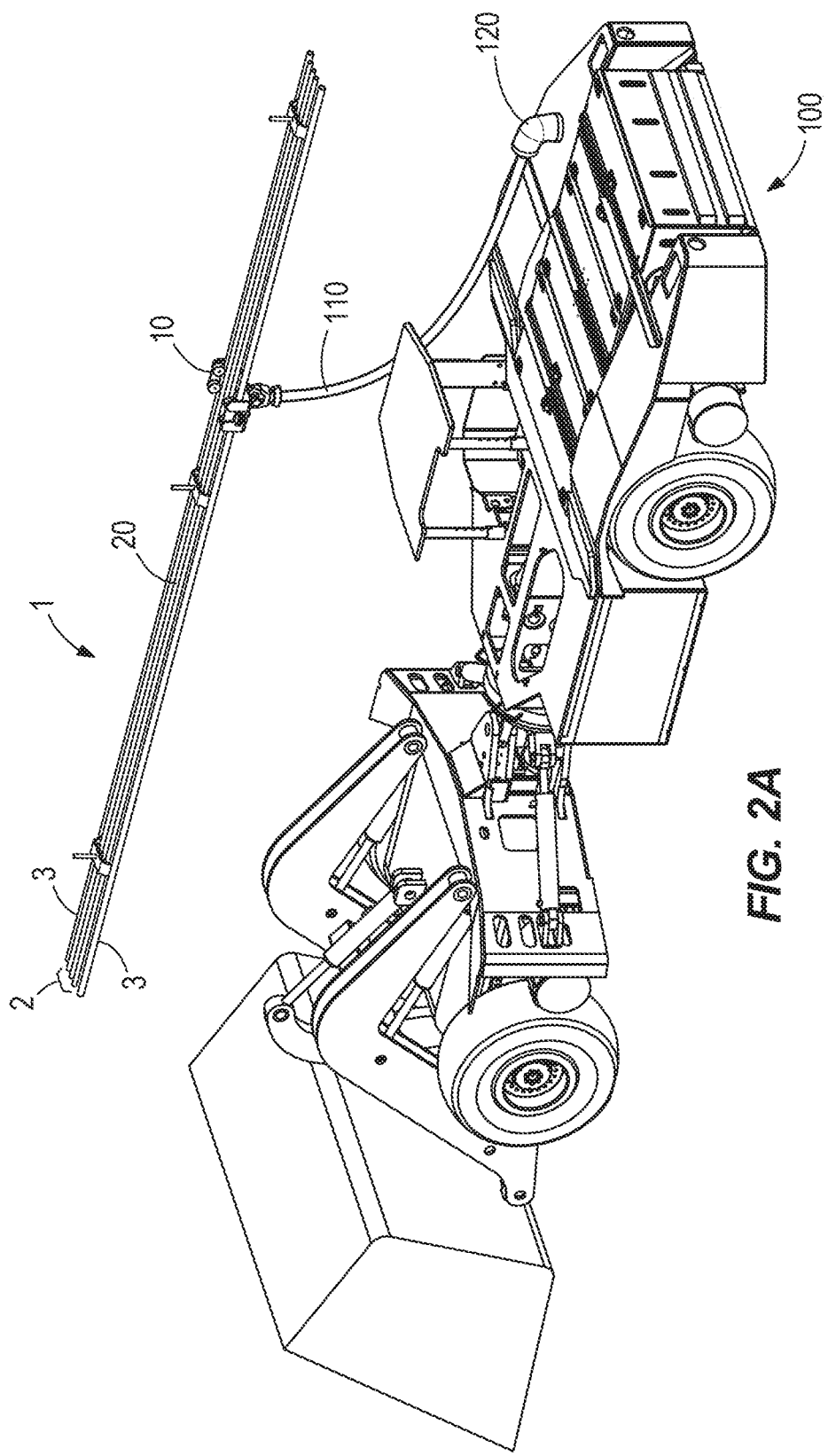
FIG. 2A is a partial right side perspective view of the mobile mining machine connected to the power grid of FIG. 1.

As shown in FIGS. 2A and 3, the overhead power structure 1 includes a plurality of generally tubular conductors 2 and rail segments 3. The outer tubes are rail segments 3 along which guide wheels 11 of the trolley 10 run, and the inner tubes are metallic conductor tubes 2 that form the conductors for a 3-phase AC power grid 20. The power grid 20 may be of multiple types, i.e. AC, DC, AC 3-phase, etc. The metallic conductor tubes 2 may be formed of copper or another conductive metal. The conductors 2 and rail segments 3 form a power grid structure 1 that is connected to the LHD 100 by a trailing cable 110.

As shown in FIGS. 2A and 3, the trailing cable 110 hangs down from the trolley 10 and connects the power from the power grid 20 to the LHD 100. The trailing cable 110, along with the associated trolley 10 and special connector 120 (further discussed below) on the LHD 100 keeps the ground or floor surface of the mine free of cables so other equipment can be more easily operated, especially other tetherless equipment.

Figure 2B:
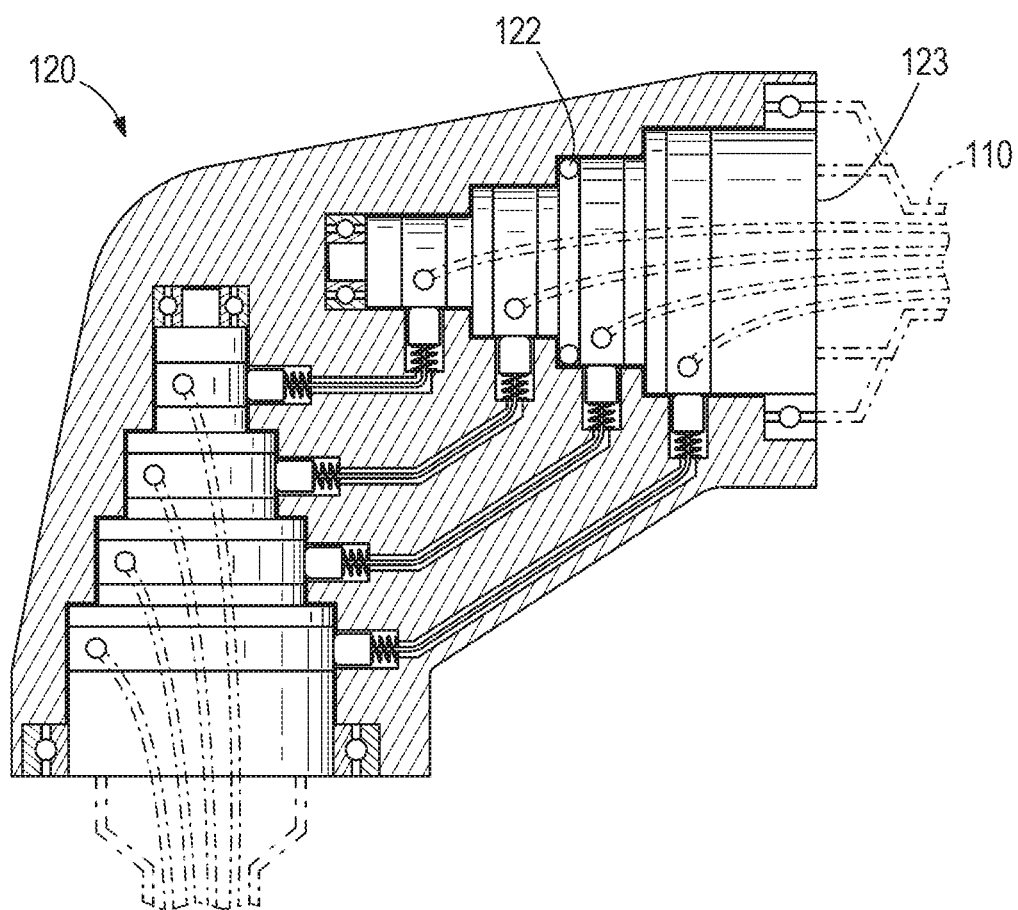
FIG. 2B is a plan view of a special connector for the mobile mining machine of FIG. 1.

As best viewed in FIG. 2B, the trailing cable 110 connects to the chassis 101 of the LHD 100 through a special connector 120 rotatable 360 degrees. The special connector 120 allows the trailing cable 110 to be safely removed without harm to the LHD 100, trolley 10, power structure 1, or mining personnel. The connector 120 includes a spring-loaded ball 121 that works in a detent 122 to hold the trailing cable 110 in a socket 123. However, with enough pull, the trailing cable 110 can be pulled out from the connector 120. The ability of the trailing cable 110 to easily release from the connector 120 is important in case the trolley 10 gets hung up, and to prevent pulling down the overhead grid segments 2, 3 in case the LHD 100 travels beyond the reach of the cable 110.

In an alternative embodiment, in addition to or instead of allowing the trailing cable 110 to release from the connector 120 in the event of a malfunction, the trolley 10 includes a control means to de-energize the power through the cable 110 to the LHD 100. The control means can include a circuit breaker, a control transformer, a contactor, a ground fault interrupter, or a logic controller mounted on the trolley. The control means may also include an angle or tension sensor that indicates a position or angle of the trailing cable 110 (i.e. that the cable 110 is not hanging substantially vertically or being pulled at some angle exceeding a pre-determined threshold angle). If the sensor determines the angle of the cable 110 exceeds the minimum threshold angle, the control means signals a cable reel 130 (further described below) to pay out additional cable 110 or signals the operator to apply the brakes to the LHD 100. If there is no cable reel 130 or if the cable 110 in the cable reel 130 has reached its maximum output, an additional ripcord may be attached between a chassis of the LHD 100 and a base of the trolley 10 to indicate that the cable 110 is at a maximum tension, thus altering the operator to apply the brakes. Additionally, the circuit breaker or a grounding circuit of the power structure 1 may cut off power to the grid 1 in the event of tension in the cable 110 reaching a second, higher threshold.

Figure 2C:
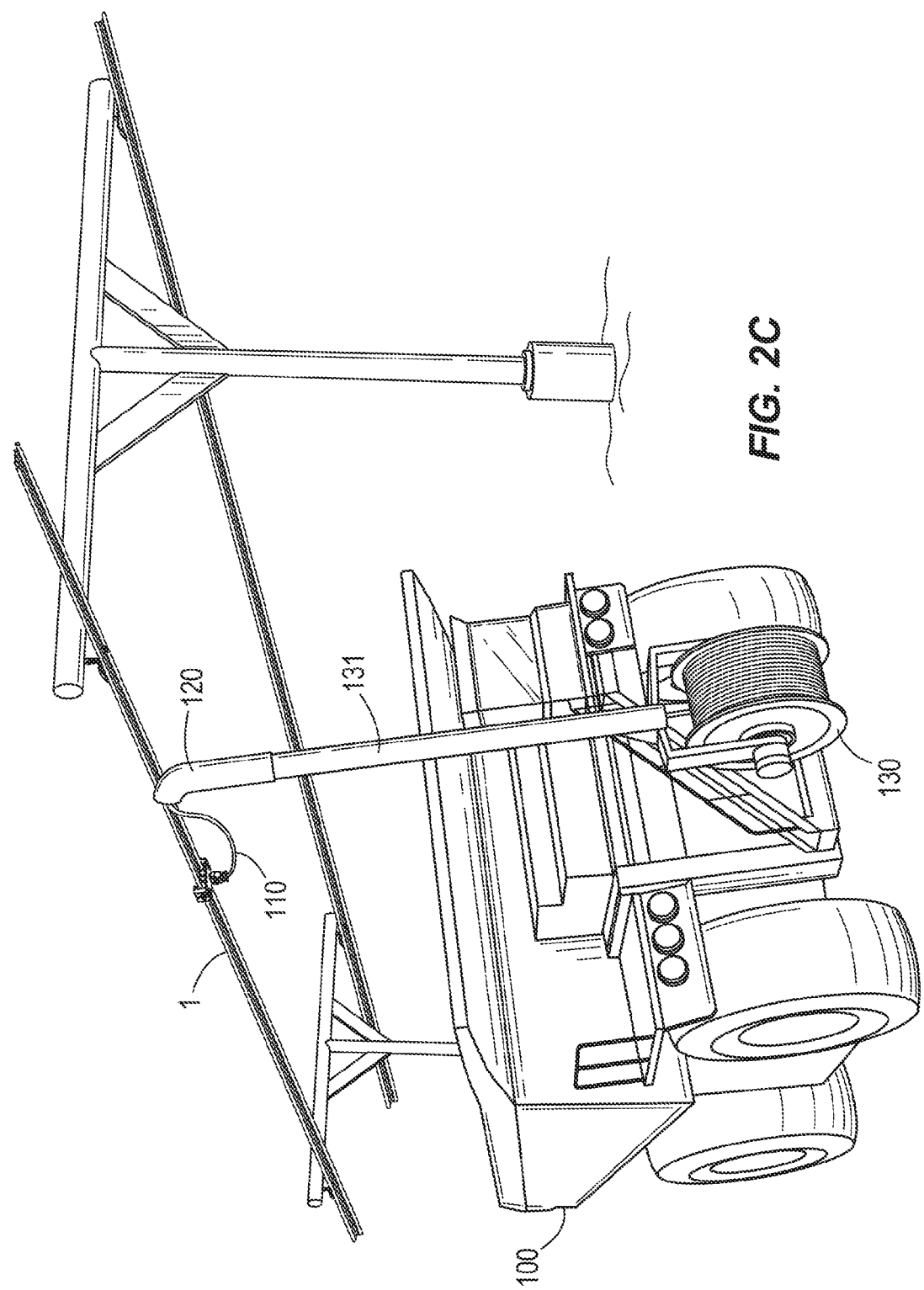
FIG. 2C is a perspective view of an alternative embodiment of the mobile mining machine.

As shown in FIG. 2C and as discussed above, the LHD 100 may include a cable reel that stores the trailing cable 110. The presence of the cable reel 130 allows the LHD 100 to move across larger distances, while still remaining connected to the overhead power structure 1. For example, the trailing cable 110 is long enough for the LHD 100 to reach into other entries far enough to load ore, or perform other required tasks, while staying connected to the overhead power grid 1 and not getting tangled up in itself. The cable reel 130 may be attached anywhere on the LHD or Haul Truck, such as the front side shown in FIG. 2C. The cable 110 is fed from the reel 130 through a vertical extension conduit 131 coupled to the cable reel 130. An upper portion of the conduit 131 is secured to the connector 120, preferably at a height approximately slightly below that of the conductors 2 and rail segments 3 of the overhead power structure 1 to minimize interference of the trailing cable 110 with other components or operators of the LHD 110. However, the conduit 131 may have other heights as desired for various operations.

Figure 3B:
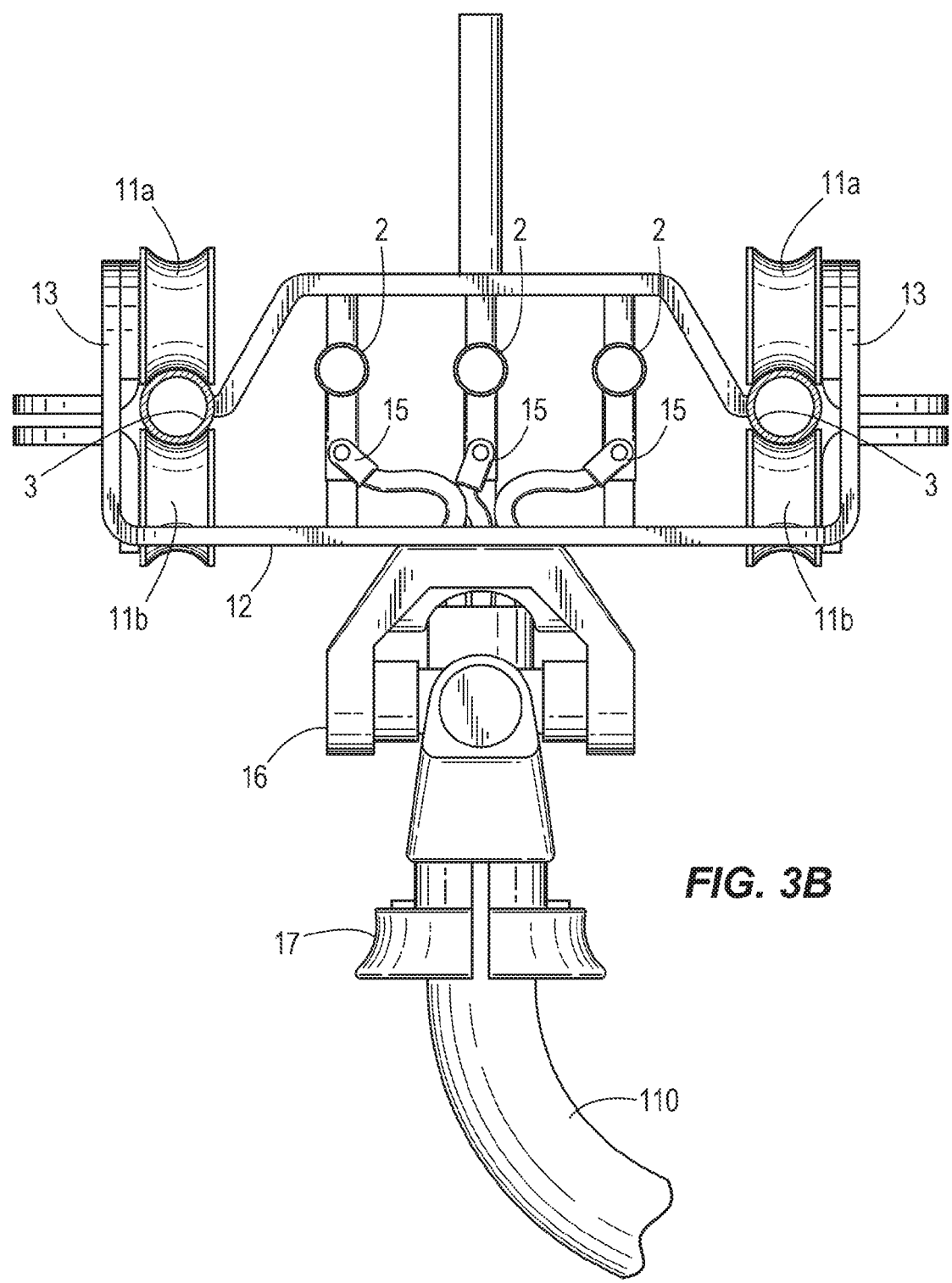
FIG. 3B is a plan view of FIG. 3A.

As discussed above, the LHD 100 connects to the power structure 1 via the trolley 10 that runs along the rail segments 3 and that commutates with the power structure 1. As shown in FIGS. 3A-3B, the trolley 10 includes a base 12 that runs below and generally parallel to the overhead power structure 1. Two flanges 13 rise upwards from respective lateral sides of the base 12 on the outside of the rail segments 3. A pair of spaced upper guide wheels 11a and a lower guide wheel 11b are secured to an inner side of each flange 13. However, the number and spacing of the upper 11a and lower 11b guide wheels may be varied. The lower guide wheels 11b cooperate with the upper guide wheels 11a to "squeeze" the rail segments 3 to ensure the trolley 10 remains properly balanced on the rail segments 3 and so that commutators 15 (further discussed below) remain properly aligned with the conductors 2.

With continued reference to FIGS. 3A and 3B, the trolley includes commutators 15 that connect to the grid conductors 2 via a commutation material such as graphite. The trailing cable 110 then connects the commutators 15 to the LHD 100. The commutators 15 may include a grounding circuit from the LHD 100, that extends through ground leads in the trailing cable 110, and then through the trolley wheels 11 that ride on the outer rails 3 of the overhead grid 1. A "universal joint" swivel 16 is disposed on the base 12 of the trolley 10 and a cable clamp 17 is used to secure the trailing cable 110 to the trolley 10. The trailing cable 110 hangs down from the clamp 17 and connects to the connector 120 mounted on the LHD 100.

Figure 4:
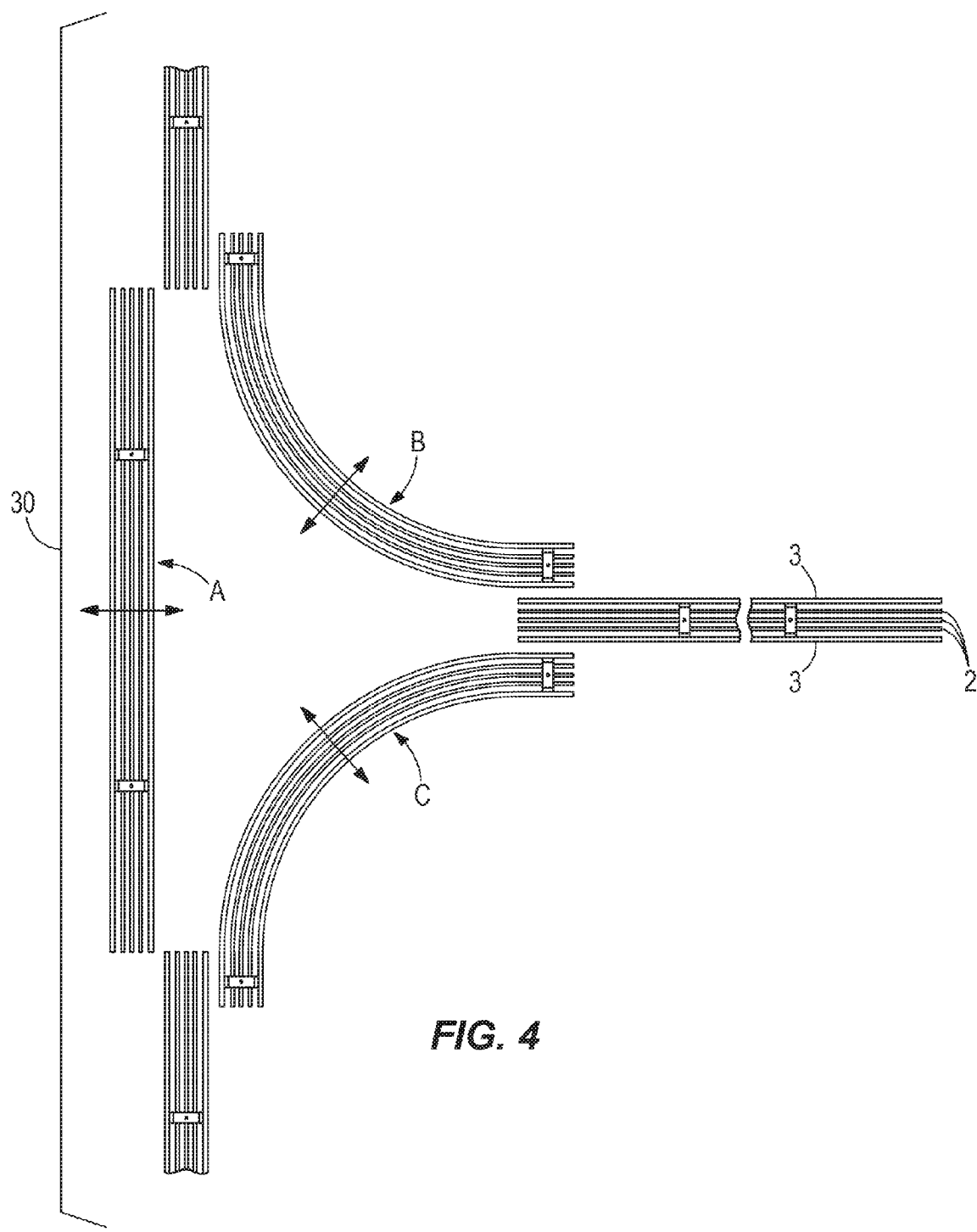
FIG. 4 is an exploded plan view of the power grid.
Figure 5:
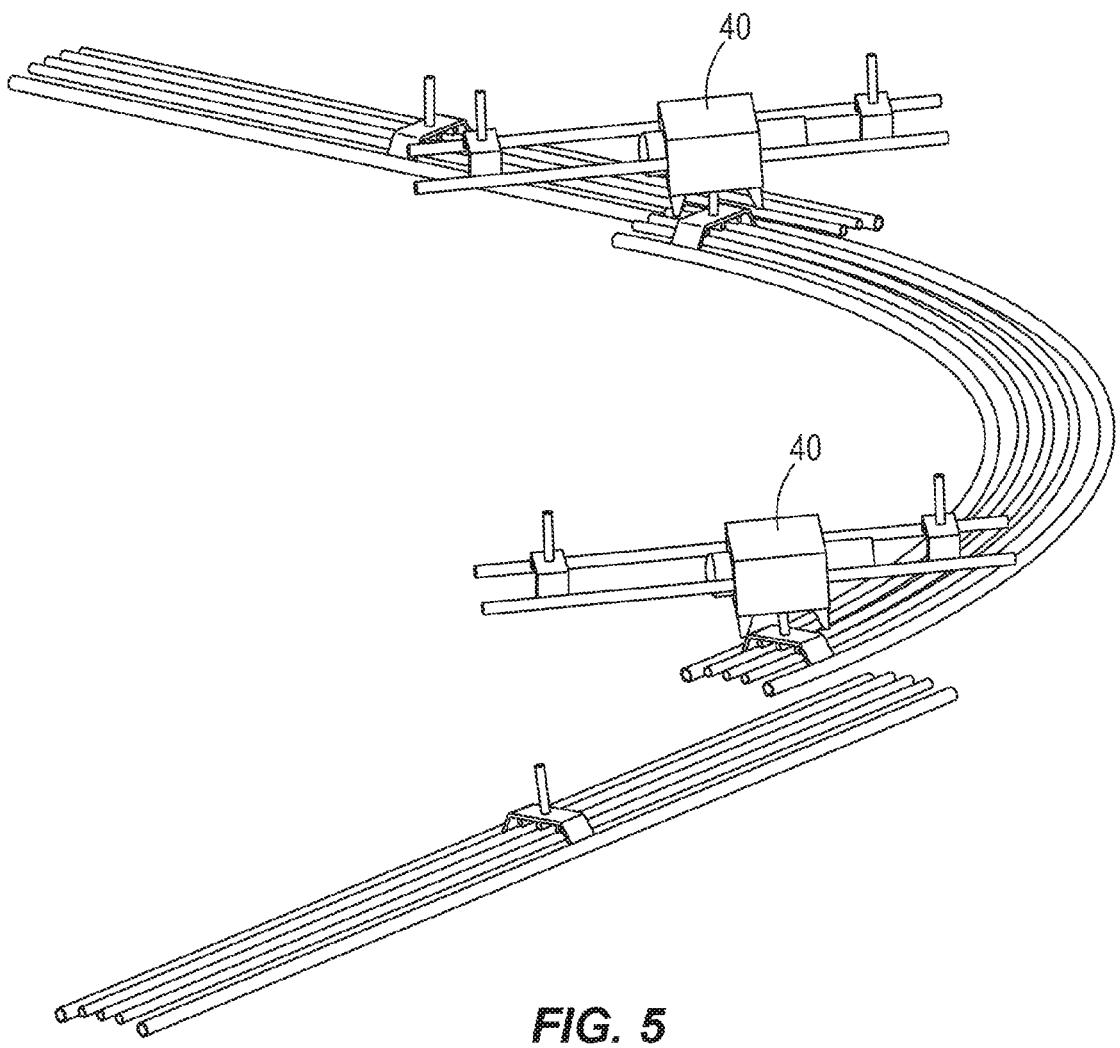
FIG. 5 is a perspective view of the power grid including a switch mechanism.
Figure 6:
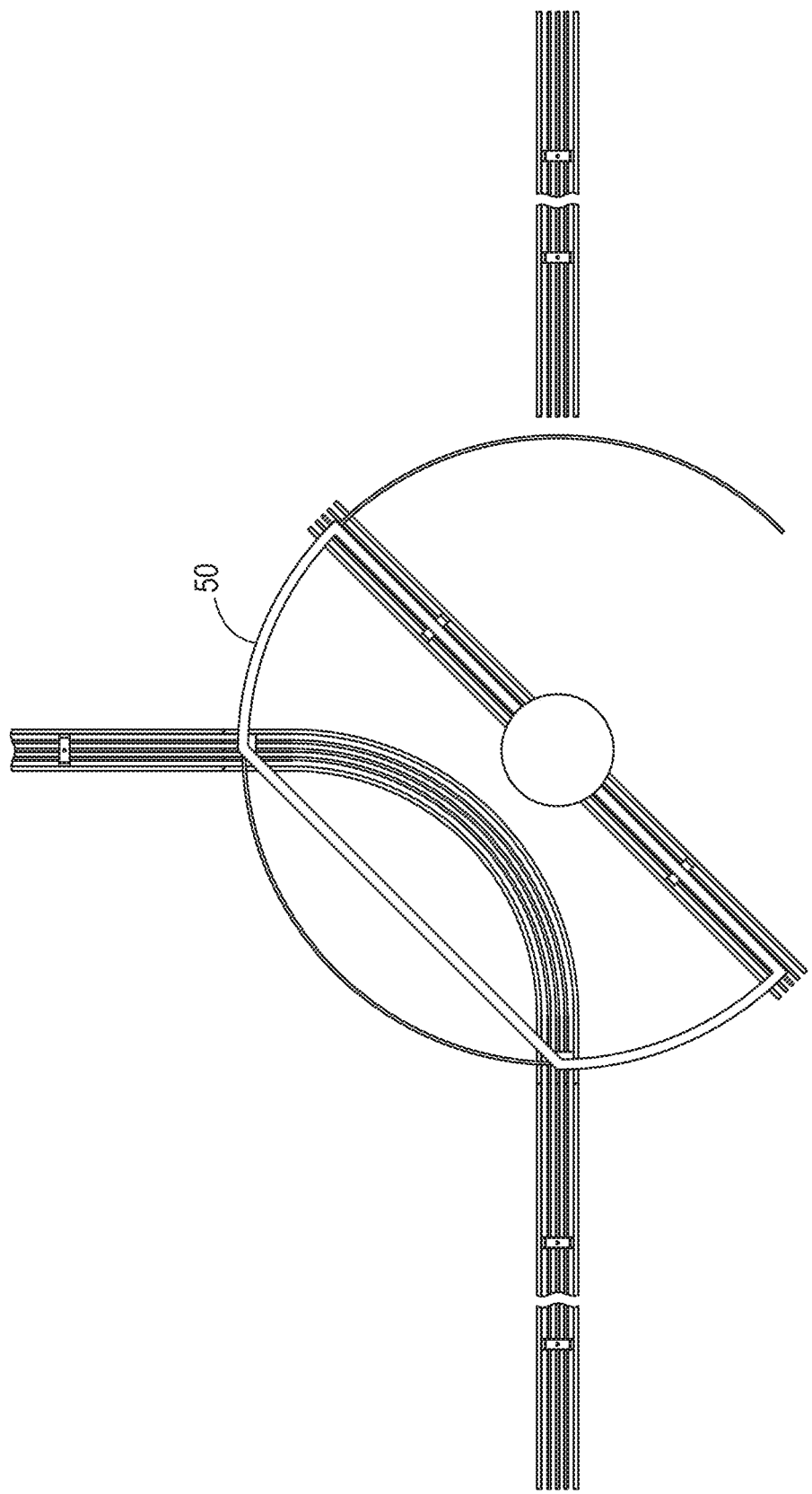
FIG. 6 is an overhead plan view of an alternative embodiment of the power grid in a turning configuration.
Figure 7:
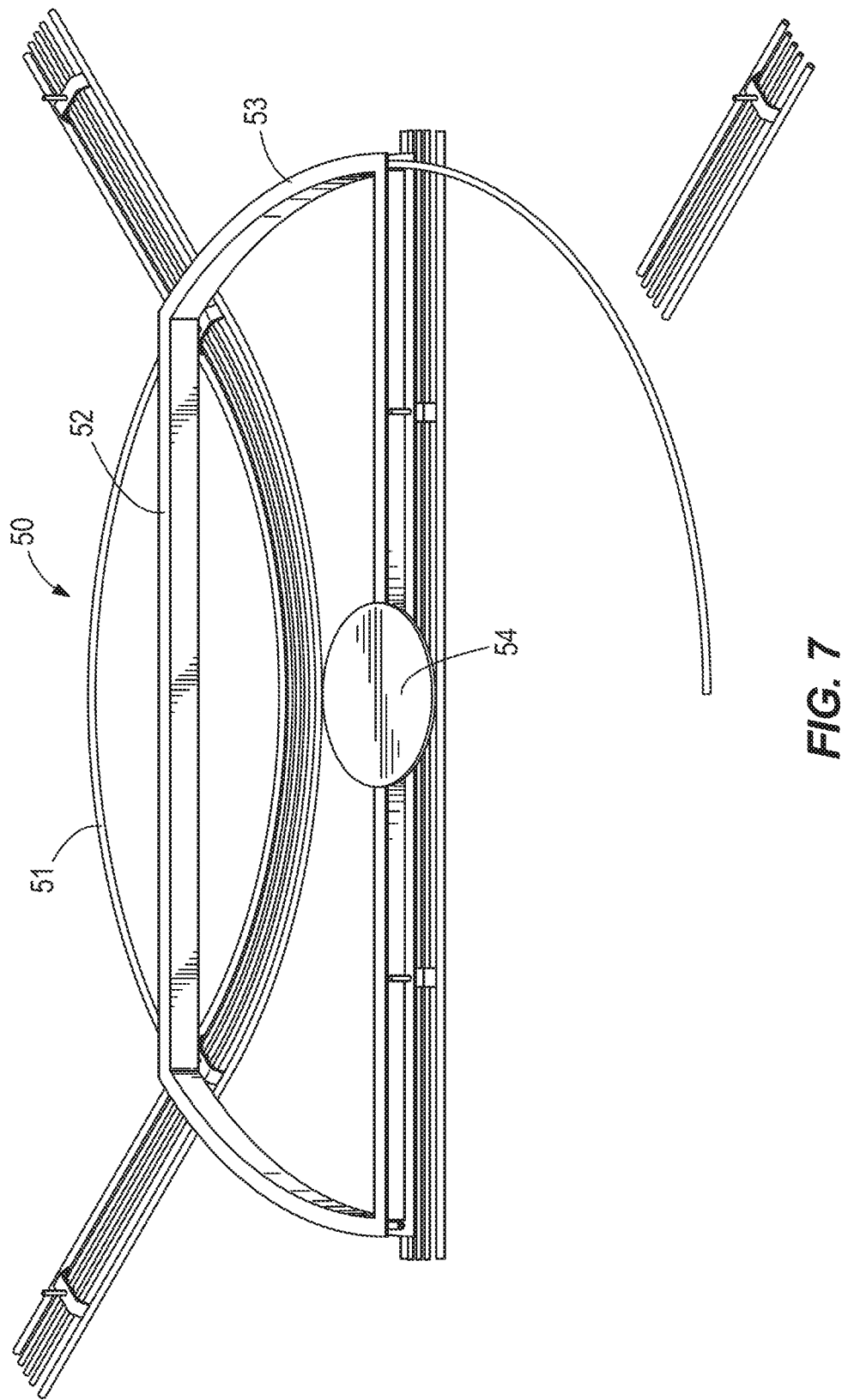
FIG. 7 is a perspective view of FIG. 6.

As shown in FIGS. 4 and 5, embodiments of the present invention also include a switch device 30 to allow movement from one mine entry to another. With reference to the plan view of FIG. 4, because the overhead grid segments 2, 3 include multiple conductors 2 (three are shown in FIG. 4) in between two outer tubular rail segments 3, the segments A, B, C may be mechanically moved into place. Segment A is slidable to the right and left in the direction of the arrows shown in the drawing in the plan view of FIG. 4 to create a straight portion of the switch 30. Segments B and C slide back and forth "over" the main track lines at a 45 degree angle (in the direction of the corresponding arrows shown in the drawing) and then drop down into position to form a right or left turn as the trolley 10 approaches from the right in FIG. 4.

In the embodiment shown in FIG. 5, movements are carried out by a winch 40 that lowers the individual segments into place. However, the movements of the segments can be carried out with slides, cams, linear actuators, belts, or other devices known in the art. A controller (not shown) may be utilized to electronically control the mechanical actuation of the segments A, B, C. A device similar to the switch device 30 could be utilized for the LHD 100 to pass another mining machine, provided enough room exists in an underground or surface passageway.

In an alternative embodiment, instead of having a separate mechanism for the respective segments of track to be switched into place, a turntable 50, shown in FIGS. 6-9, performs the switching of the pieces of track. The turntable 50 includes a generally circular outer ring 51 and a support member 52 connected to and extending between the ring 51. The support member 52 connects the ring 51 to a straight rail segment and/or a curved rail segment. The support member 52 shown in FIGS. 6-9 has a generally rectangular shape, with arc-shaped longitudinal end sides 53, the arc-shaped end sides 53 mating with the ring 51. The support member 52 includes a base member 54 disposed thereon so that the turntable 50 may be suspended from a ceiling.

Figure 8:
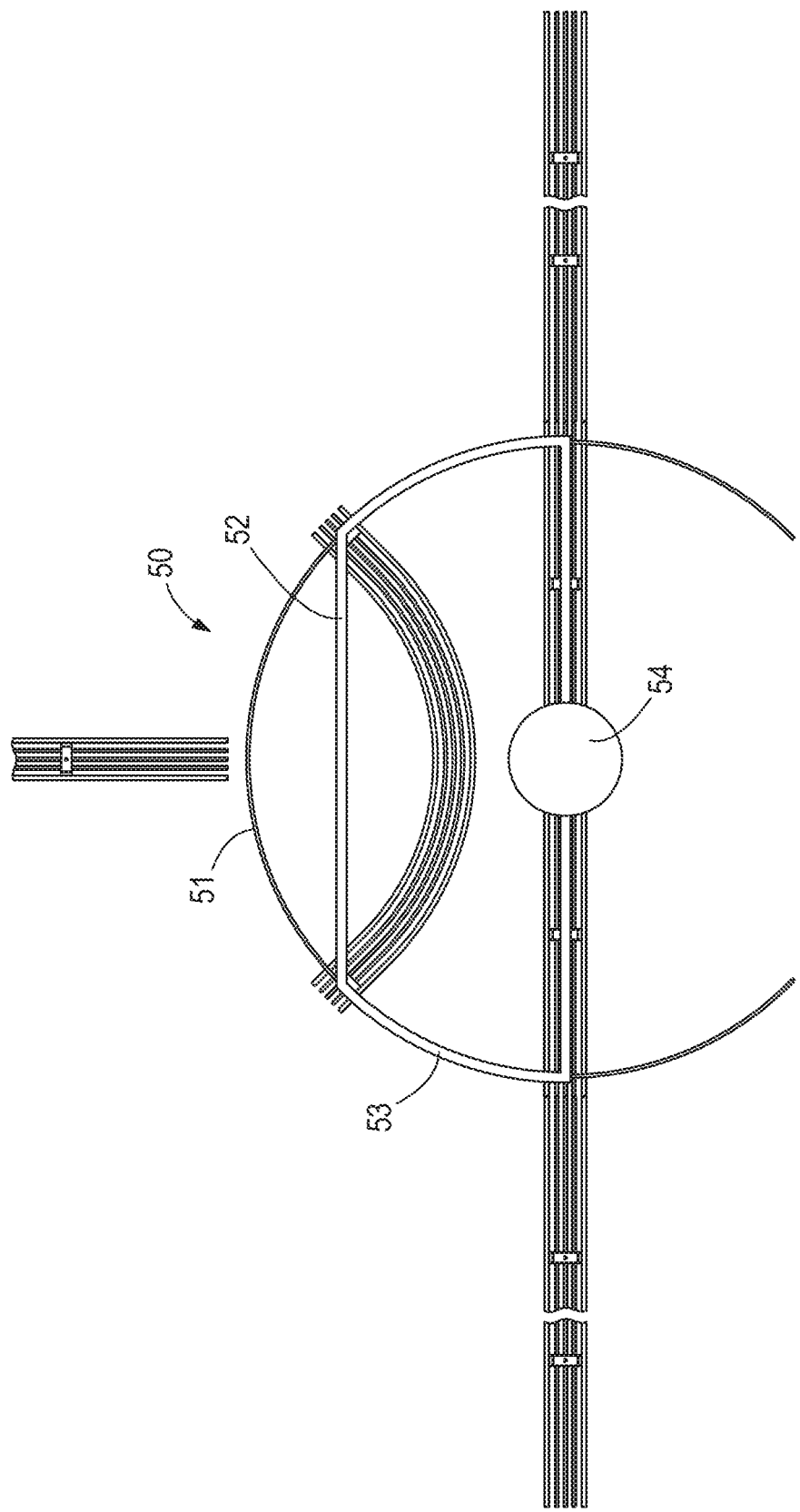
FIG. 8 is an overhead plan view of the alternative embodiment of the power grid of FIG. 6 in a straight configuration.
Figure 9:
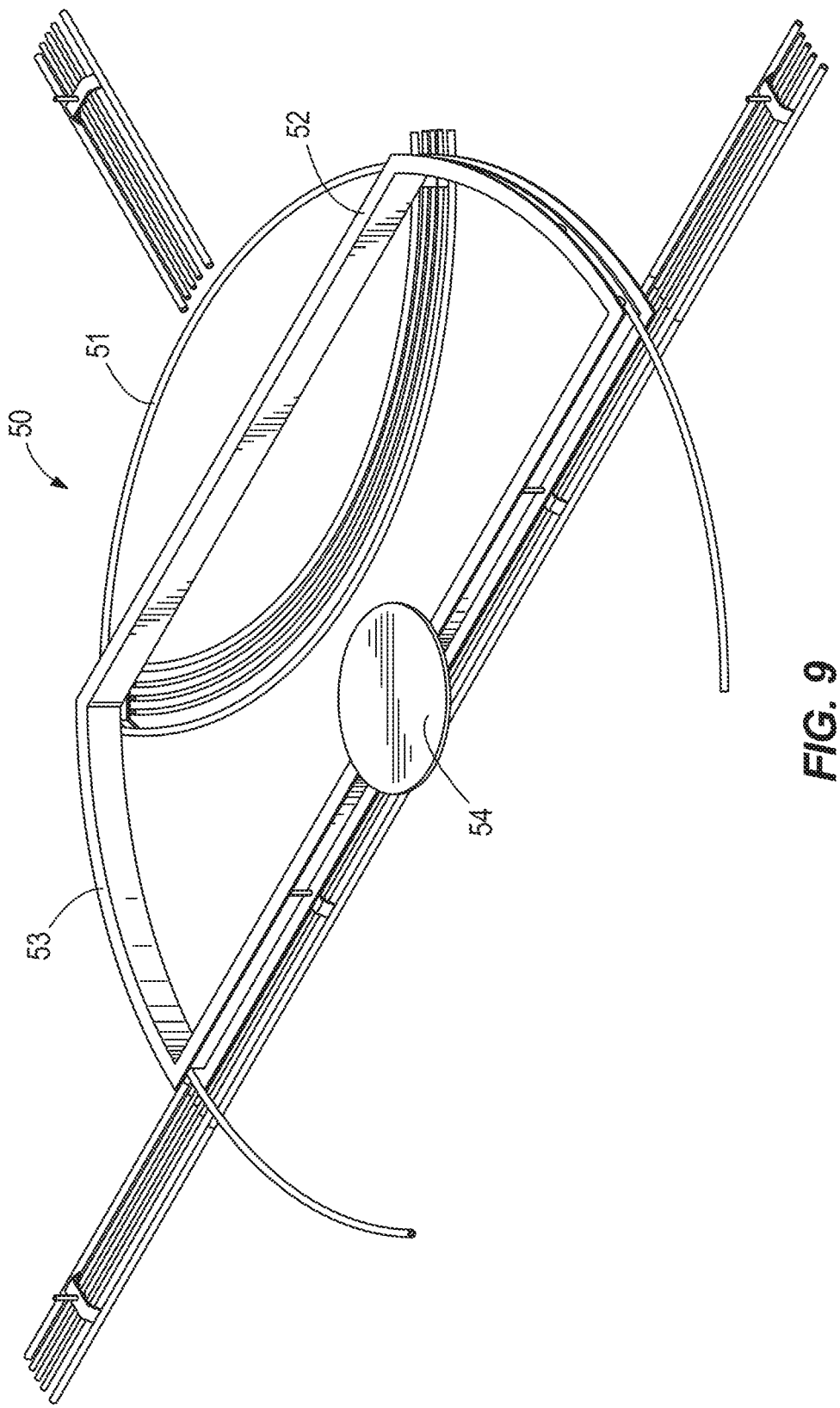
FIG. 9 is a perspective view of FIG. 8.

The turntable 50 is rotatable to align either the curved rail segment in order for the LHD 100 to make a right or left turn (FIGS. 6-7) or to align the straight rail segment with the fixed portions of the track in order for the LHD 100 to move straight (FIGS. 8-9). The turntable 50 could be modified to be used in a 4-way intersection, if necessary. A controller (not shown) having a motor position sensor or the like may be used to control rotation of the turntable.

In operation, as the LHD 100 moves along entryways in an underground mine, or along dedicated roadways on a surface mine, the trailing cable 110 pulls the trolley 10 along the overhead power grid system 1, thus maintaining connectivity to the power grid 20. The LHD 100 can move about and turn completely around in a circle without the trailing cable 110 binding or touching the ground. The connection to the mining machine 100 includes a "breakaway" connector 120 in case the LHD 100 tries to move further than a maximum distance the trailing cable 110 will allow. The mobile mining machine 100 would then be able to move about the entries in an underground mine by "towing" its trolley 10 behind, while drawing power from the overhead grid structure 1.

The overhead power grid 1 for mobile mining machines 100 according to embodiments of the present invention utilizes electric-powered mining machines 100 in surface and underground mines without the use of ground-engaging trailing cables and/or cable reels. The typical trailing cable with a cable reel wears out quickly and hinders the passage of multiple cable-reel powered machines (which cannot drive over energized cables). The overhead grid system 1 eliminates this gridlock scenario by providing switches 30 and intersections where machines may pass each other. For instance, if two LHD's 100 approach the intersection depicted in FIG. 3, one from the bottom of the figure and one from the right side of the figure, and both attempt to head towards the top of the figure, one of the LHD's 100 can stop, wait for the other to pass through the intersection, and then continue behind the first. If these mining vehicles used "lay-down" trailing cables via a machine-mounted cable reel, the second LHD 100 would have to wait for the first 100 to return and pass back through the switch in the direction it originally came from before the second LHD 100 could proceed towards a position at the top of the figure.

The overhead power grid 1 for mobile mining machines 100 offers significant health and safety advantages over diesel power machines by reducing or totally eliminating the dependence on diesel power, as all of the machines connected to the grid would be electrically powered, for example, via a Variable Frequency Drive (VFD) and/or a Switched Reluctance Drive (SRD). Utilizing these electronic drive technologies in conjunction with the overhead power grid 1 also offers the advantage of greater power when needed and the ability to "regenerate" braking power back into the grid, thus optimizing energy efficiencies. Regeneration is the process of using the electric wheel motors as generators to convert the energy of deceleration (braking) and turn it back into the same voltage and frequency to pump it back on the grid 1.

FIGS. 10A-D illustrate a power grid according to another embodiment. The power grid 20 is a 3-phase AC power supply and includes a first conductor 202, second conductor 203, and third conductor 204. Each conductor carries an AC current of the same frequency and voltage, with a phase difference. For example, the first conductor 202 conveys electrical current having a first phase, the second conductor 203 conveys the same electrical current as the first conductor 202 but having a second phase, and the third conductor 204 conveys the same electrical current as the other conductor but having a third phase. The current in each conductor is out of phase with each other conductor.

The power grid 20 also includes a switch device 230 to allow a vehicle to move from one mine entry to another. The switch device may permit the vehicle and trolley as described above to move between a primary track 210 and an auxiliary track 220 via switch segments A, B, and C. In the exemplary construction, illustrated in FIGS. 10B and 10C, each conductor 202, 203, 204 of the primary track 210 is aligned with a corresponding conductor 202, 203, 204 of the switch. Stated another way, the first conductor 202 of the switch segment A is connected to and associated with the first conductor 202 of the primary track 210, the second conductor 203 of the switch segment A is connected to and associated with the second conductor 203 of the primary track 210, and the third conductor 204 of switch segment A is connected to and associated with the third conductor of the primary track 210. In addition, each conductor 202, 203, 204 of the switch segments are connected to the corresponding conductor of the output or destination track (e.g., the lower end of the primary track 210 in FIG. 10B, and the auxiliary track 220 in FIG. 10C). The properly aligned conductors 202, 203, 204 allow the trolley 10 (FIG. 2A) to move sequentially from one track section to another track section while maintaining proper electrical communication with each conductor 202, 203, 204, thereby allowing the machine to move between mine entries.

Figure 10A:
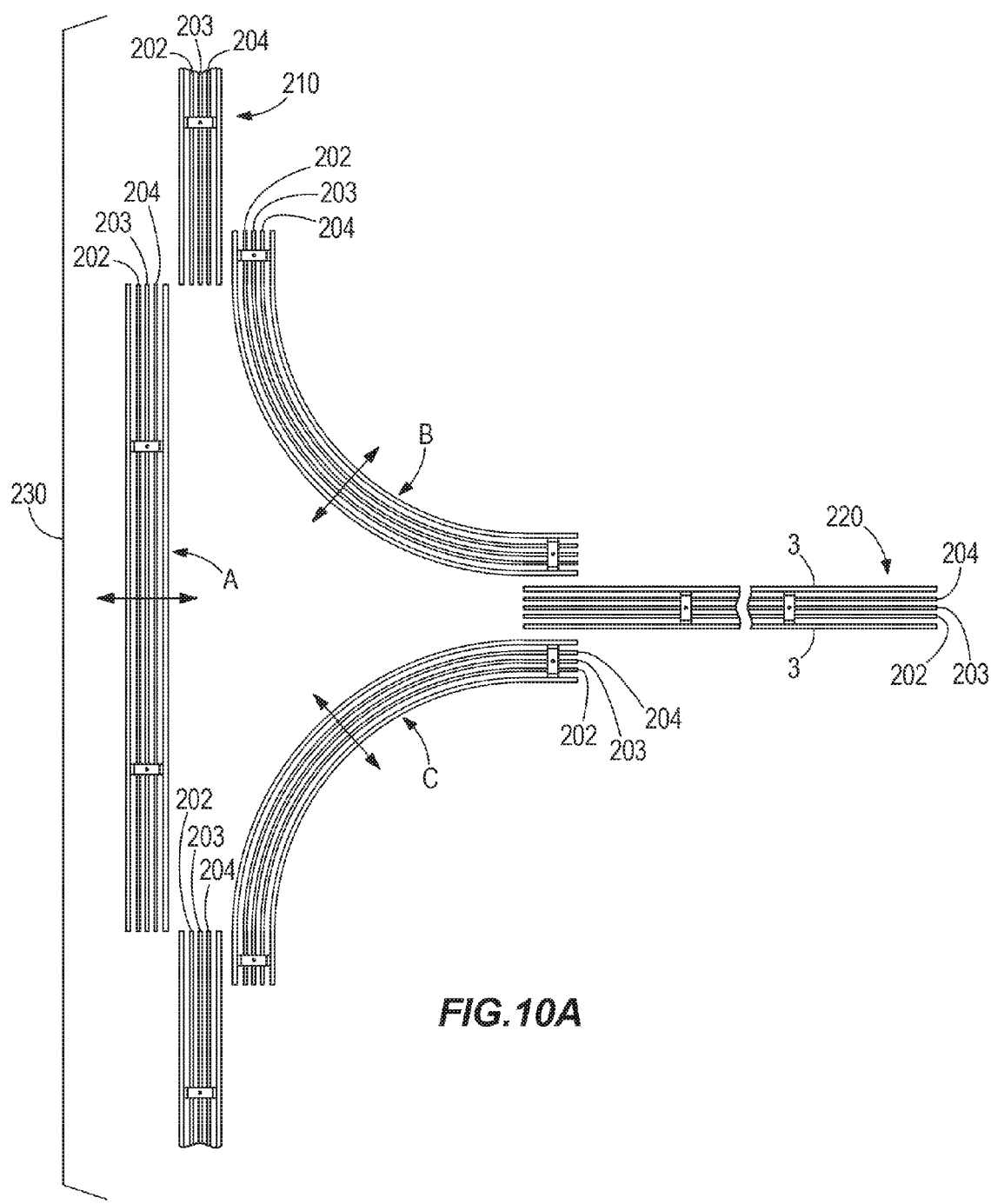
FIG. 10A is a plan view of a power grid according to another embodiment.
Figure 10B:
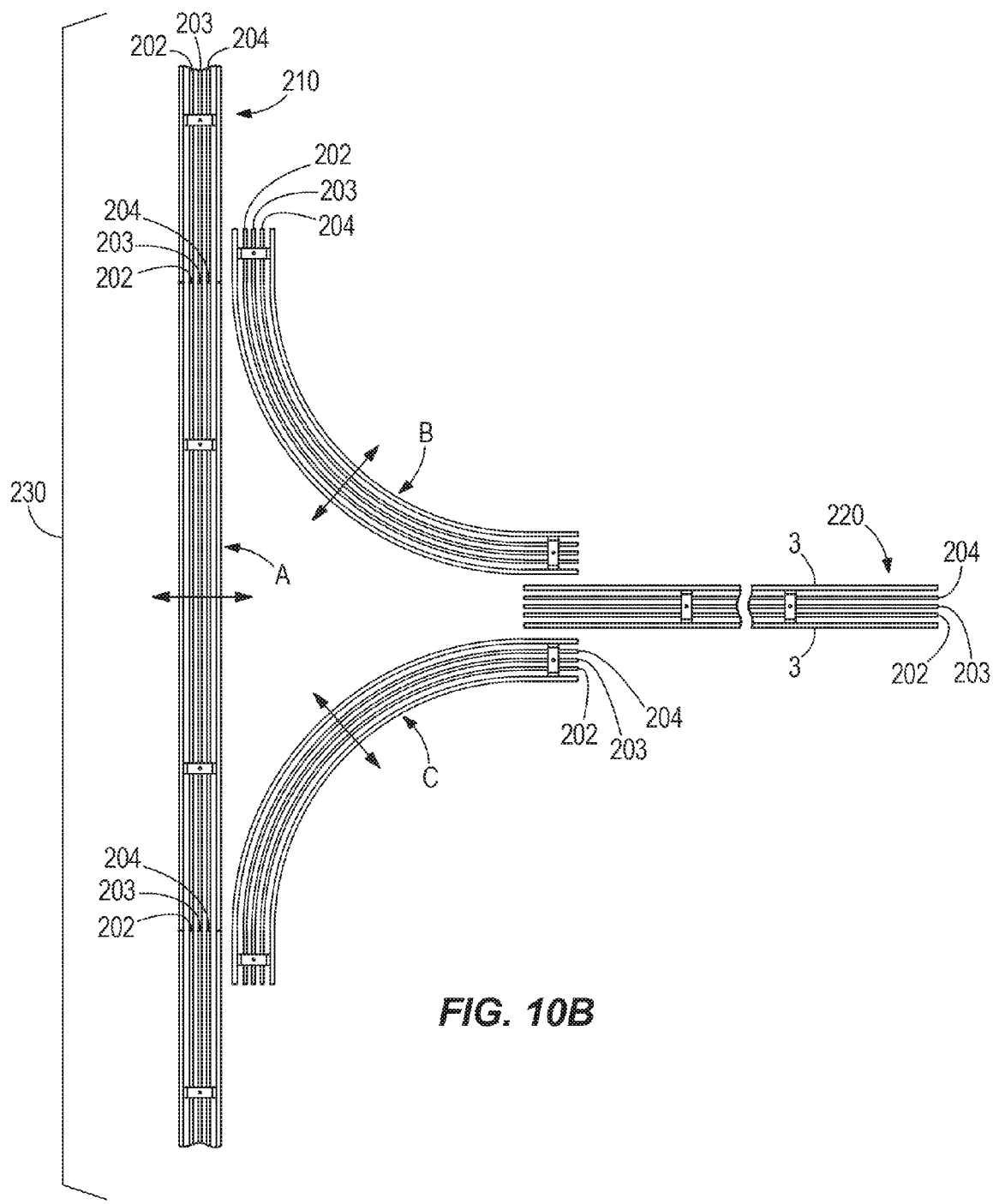
FIG. 10B is a plan view of the power grid shown in FIG. 10A in a first state.
Figure 10C:
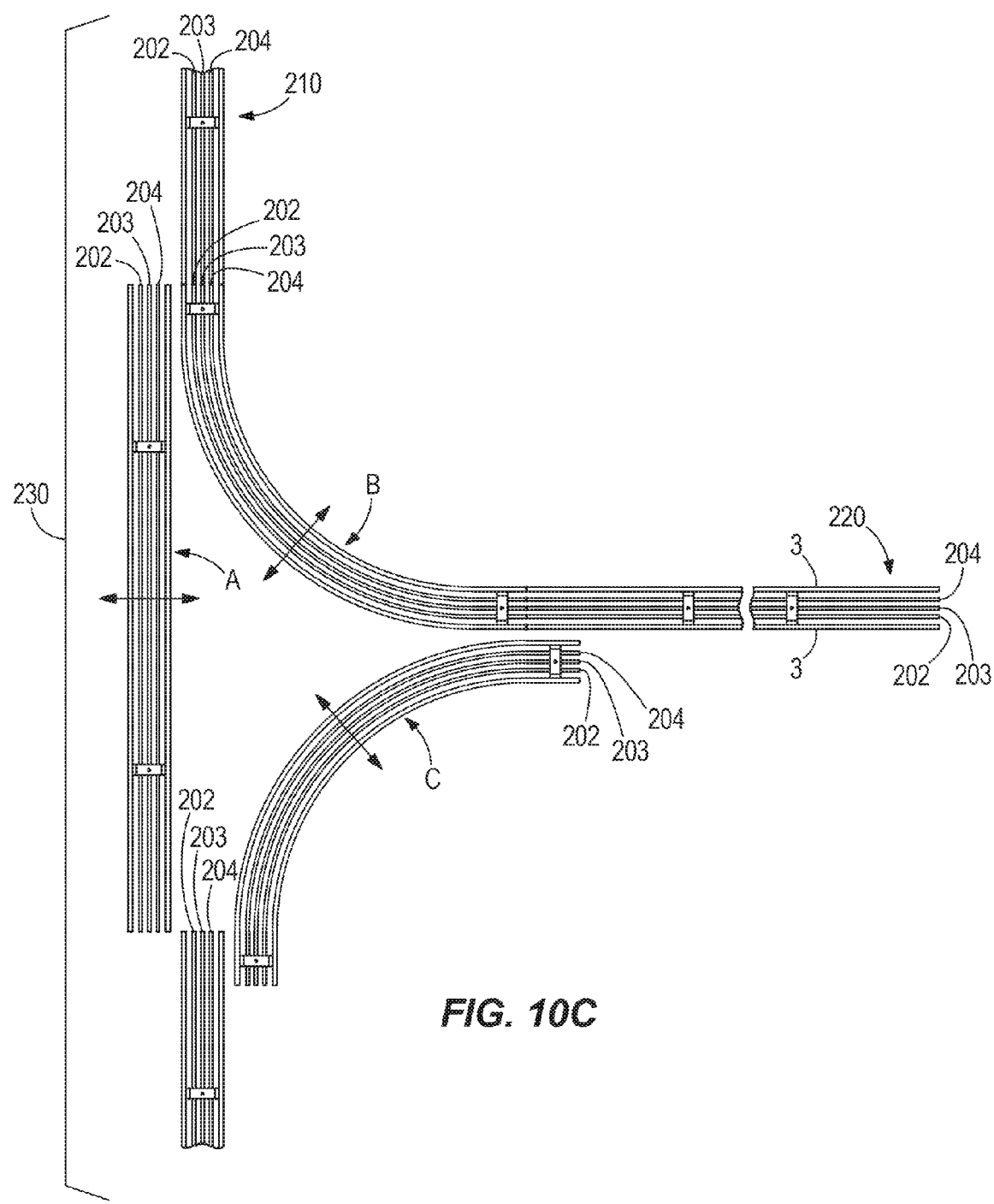
FIG. 10C is a plan view of the power grid shown in FIG. 10A in a second state.
Figure 10D:
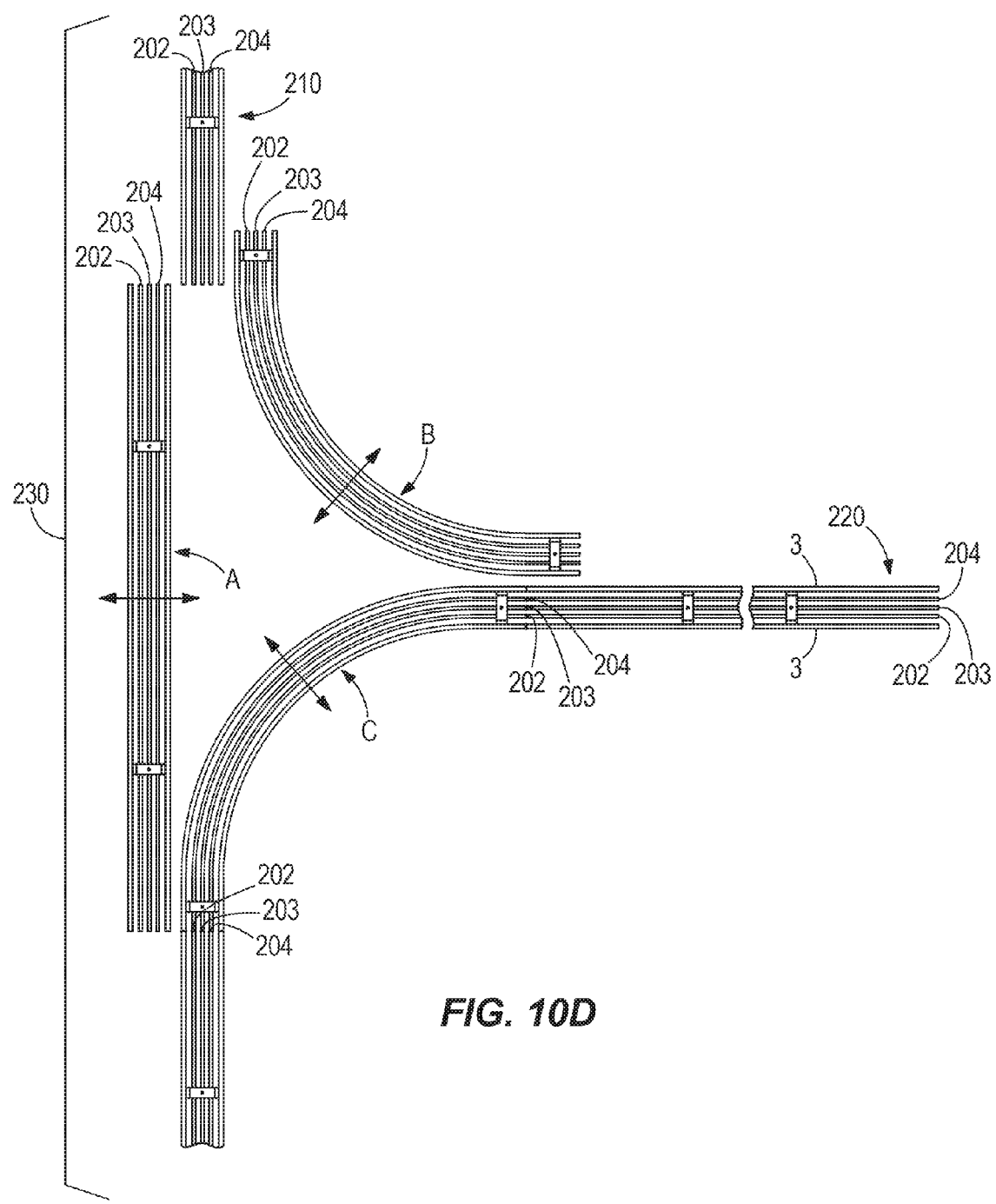
FIG. 10D is a plan view of the power grid shown in FIG. 10A in a third state.

Referring to FIG. 10D, the conductors 202, 203, 204 of the switch device 230 may become misaligned with the conductors of the primary track 210 in some configurations. In the illustrated example, the first conductor 202 of the auxiliary track 220 is connected to the third conductor 204 of the lower end of the primary track 210. The electrical current carried by each conductor is therefore out-of-phase between the switch segment C and the primary track 210, which could damage the line and pose a safety hazard.

Figure 11:
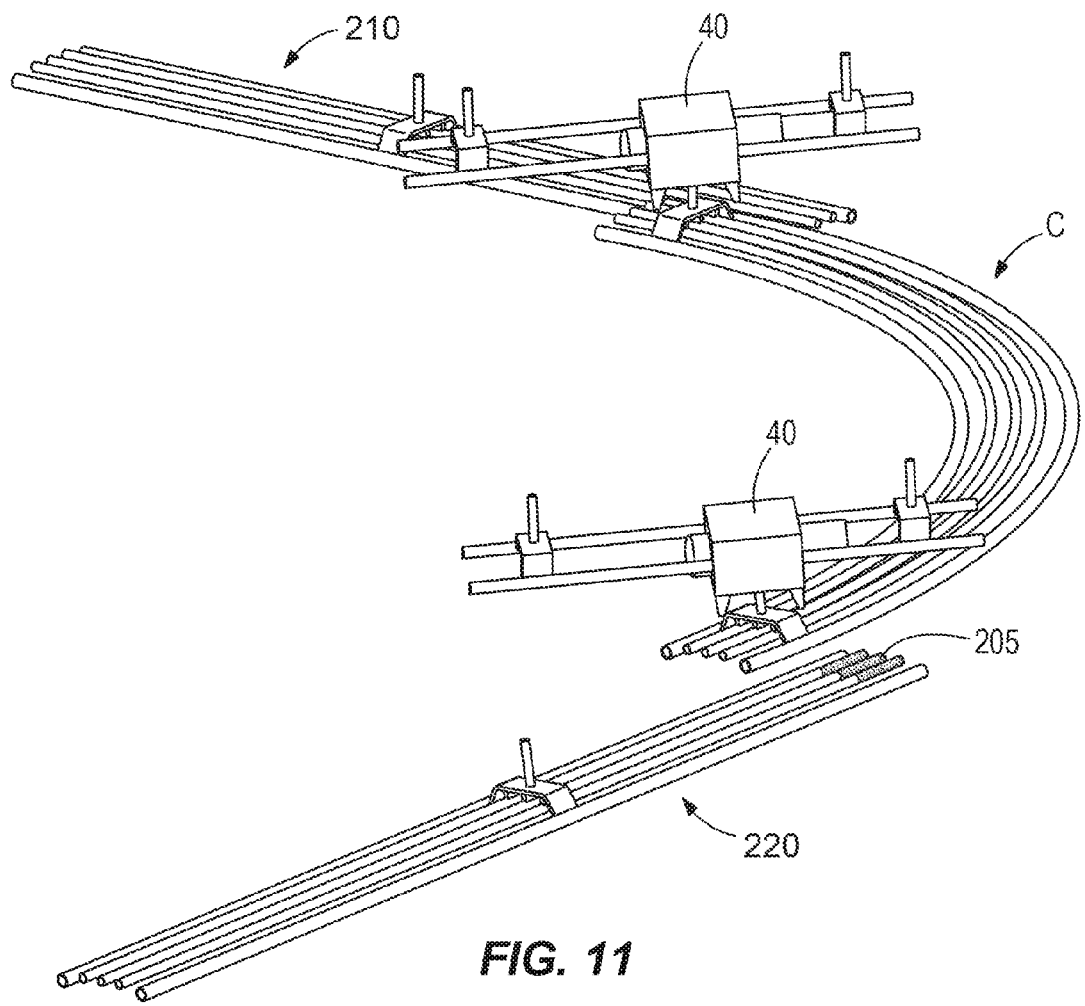
FIG. 11 is a perspective view of a portion of the power grid of FIGS. 10A-D.
Figure 12:
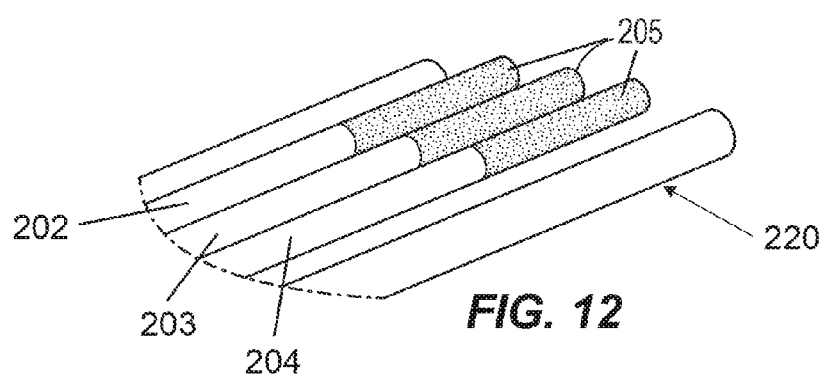
FIG. 12 is an enlarged perspective view of a portion of the power grid of FIG. 11.

As shown in FIGS. 11 and 12, the end of each conductor 202, 203, 204 of the auxiliary track 220 is coupled to a transition member or connector member 205. In one embodiment, each connector member 205 is made from a non-conducting material (e.g., plastic). In other embodiments, the connector members 205 may be formed integrally with one another. When the trolley 10 passes over the connector members 205, the contacts of the trolley pass through a "dead zone" in which no current is transmitted through the contacts. This dead zone allows the electrical current to "reset" or to be re-conditioned to accept current from the conductors from the switch segment C that the trolley 10 contacts next, even if the conductors 202, 203, 204 have a different phase configuration. The "reset" may occur as the trolley is disconnected from the power (e.g., comes into contact with the connector member 205). Even though the power supply to the vehicle may be interrupted, the motion of the trolley and the vehicle provides sufficient inertia to move the trolley over the connector 205 and into engagement with the next section of the conductors 202, 203, 204.

In other embodiments, the connectors 205 may be secured to the conductors on the switch segment instead of or in addition to being secured to the track 220. Furthermore, each end of the conductors on the primary track 210, the auxiliary track 220, and the switch segments A, B, and C may include a connector 205. The connector may be coupled to one or more ends of the switch, one or more ends of the primary track 210, and/or one or more ends of the auxiliary track 220, or any combination thereof.

In another construction, the engagement of the trolley 10 with the connectors 205 may create a signal (e.g., via wireless communication) to the trolley 10 to prepare for a switch in the phase of the AC current supplied by each conductor 202, 203, 204. In yet another construction, the engagement between the trolley 10 and the connector 205 may signal a mechanical switch element on the trolley 10 to maintain contact with the same phase conductor 202, 203, 204. Each of these embodiments is exemplary by nature, and other suitable switch mechanisms, both mechanical and electrical, may be used.

In operation, the switch device 30 utilizes an actuator to move switch segments A, B, C generally along the directions of the arrows shown in FIGS. 10A-10D into and out of alignment with primary track 210 to allow the LHD vehicle to selectively move between primary track 210 and auxiliary track 220. When switching from track to another track, the non-conducting connector 205 accounts for any phase difference in the current or voltage carried by conductors 202, 203, 204, resetting the trolley to accept the phase configuration of the track toward which the trolley 10 is travelling.

Although the invention has been described in detail with reference to certain preferred embodiments, variations and modifications exist within the scope and spirit of one or more independent aspects of the invention as described.

What is claimed is:

1. A system for connecting a vehicle to an overhead power structure, the system comprising:
    a chassis;
    a cable for transmitting electrical power from the overhead power structure to the chassis, the cable having a first end mechanically and electrically coupled to the chassis and a second end configured to mechanically and electrically connect to the overhead power structure;
    a connector coupled to the chassis and receiving the first end of the cable;
    a sensor for detecting a condition of the cable; and
    a control system capable of interrupting a flow of power to the chassis if the sensed condition exceeds a predetermined threshold.

2. The system of claim 1, wherein the sensor detects one of an angle of the cable suspended from the power structure and a tension in the cable.

3. The system of claim 1, wherein the connector includes a reel for reeling in and paying out the cable, wherein the control system includes a controller for operating the reel in response to the sensed condition of the cable.

4. The system of claim 1, wherein the control system further includes a controller such that, when the sensed condition of the cable exceeds a predetermined threshold, the controller sends a signal alerting an operator of the vehicle to decrease the speed of the chassis.

5. The system of claim 1, wherein the control system includes a controller interrupting the flow of power to the chassis if the sensed condition exceeds a predetermined threshold.

6. The system of claim 5, wherein the control system includes one of a circuit breaker, a control transformer, a contactor, a ground fault interrupter, and a logic controller.

7. The system of claim 1, wherein the connector is rotatable 360 degrees relative to the chassis.

8. The system of claim 1, further comprising a cable reel for reeling in and paying out the cable, wherein the control system includes a controller configured to receive a signal from the sensor and, in response to the signal, operate the cable reel.

9. The system of claim 8, wherein operating the cable reel includes rotating the cable reel to pay out additional cable.

10. The system of claim 8, wherein the cable reel includes a ripcord that is activated when a maximum length has been paid out from the cable reel.

11. A method of controlling a vehicle having a chassis, the method comprising:
    providing an overhead power structure, a connector coupled to the chassis, and a cable extending between the overhead power structure and the connector to provide electrical communication between the overhead power structure and the chassis;
    sensing a condition of the cable as the chassis is moved; and
    interrupting the electrical communication between the chassis and the overhead power structure in response to the sensed condition of the cable exceeding a predetermined value.

12. The method of claim 11, wherein interrupting electrical communication includes using at least one of a circuit breaker, a control transformer, a contractor, a ground fault interrupter, and a logic controller.

13. The method of claim 11, wherein interrupting electrical communication includes disconnecting an end of the cable from the connector.

14. The method of claim 11, further comprising
    comparing the sensed condition against a predetermined threshold; and
    at least one of alerting an operator to decrease a speed of the chassis and paying out additional cable if the sensed condition exceeds a predetermined value.

15. The method of claim 14, wherein sensing a condition of the cable includes one of detecting an angle of a suspended portion of the cable relative to a vertical plane detecting a tensile force exerted on the cable.

16. A system for connecting a vehicle to an overhead power structure, the system comprising:
    a chassis;
    a cable connected to the chassis and configured to mechanically and electrically connect the chassis to the overhead power structure, at least one of a mechanical connection and an electrical connection between the cable and the chassis being interrupted when a condition of the cable exceeds a predetermined threshold; and
    a connector coupled to the chassis and rotatable 360 degrees relative to the chassis, and the connector including a socket for receiving the cable, the connector releasably coupling the cable to the chassis.

17. The system of claim 16, wherein the connector includes a spring-loaded ball in a detent to releasably hold the connector in the socket of the chassis.

18. The system of claim 16, further comprising a cable reel, at least a portion of the cable wrapped onto the cable reel.

19. The system of claim 16, further comprising
    a sensor detecting the condition of the cable and generating a signal indicative of the sensed condition, the condition including at least one of an angle of the cable suspended from the overhead power structure and a tension in the cable; and a controller receiving the signal from the sensor and comparing the signal against the predetermined threshold.

20. The system of claim 19, wherein the controller interrupts the electrical power transmitted to the chassis if the signal exceeds the predetermined threshold.

* * * * *